United States Patent
Li

(10) Patent No.: US 8,711,555 B2
(45) Date of Patent: Apr. 29, 2014

(54) MOUNTING APPARATUS FOR PCI CARD

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 248 days.

(21) Appl. No.: 13/212,479

(22) Filed: Aug. 18, 2011

(65) Prior Publication Data

US 2012/0229976 A1 Sep. 13, 2012

(30) Foreign Application Priority Data

Mar. 7, 2011 (CN) .......................... 2011 1 0053733

(51) Int. Cl.
- G06F 1/16 (2006.01)
- H05K 7/00 (2006.01)
- H05K 5/00 (2006.01)
- H05K 7/14 (2006.01)

(52) U.S. Cl.
USPC ................. 361/679.32; 361/679.31; 361/747; 361/759; 361/801

(58) Field of Classification Search
USPC ........................ 361/679.31, 679.32, 801, 802, 361/807–810, 752, 790, 747, 759; 439/160
See application file for complete search history.

(56) References Cited

U.S. PATENT DOCUMENTS

| | | | |
|---|---|---|---|
| 5,544,006 A * | 8/1996 | Radloff et al. | 361/679.32 |
| 5,822,196 A * | 10/1998 | Hastings et al. | 361/801 |
| 6,950,313 B1 * | 9/2005 | Shih | 361/759 |
| 6,960,720 B2 * | 11/2005 | Wen-Lung | 174/50 |
| 7,012,813 B2 * | 3/2006 | Wang et al. | 361/801 |
| 7,057,902 B2 * | 6/2006 | Li | 361/801 |
| 7,310,241 B2 * | 12/2007 | Peng et al. | 361/801 |
| 7,561,440 B2 * | 7/2009 | Dai | 361/801 |
| 2003/0099096 A1 * | 5/2003 | Megason et al. | 361/759 |
| 2009/0253285 A1 * | 10/2009 | Yang | 439/312 |

* cited by examiner

Primary Examiner — Jayprakash N Gandhi
Assistant Examiner — Nidhi Desai
(74) Attorney, Agent, or Firm — Novak Druce Connolly Bove + Quigg LLP

(57) ABSTRACT

A mounting apparatus for a PCI card includes an enclosure, a mounting bracket, a securing bracket mounted in the enclosure, and a securing member pivotably mounted on the securing bracket. The mounting bracket is used for securing a first end of the PCI card. The securing bracket includes a main body and an elastic securing portion extending from the main body. The securing member includes a pressing panel and a securing part. The pressing panel defines a receiving slot. The securing part is used for engaging the elastic securing portion to enable the pressing panel to press a second end of the PCI card. The receiving slot is used for receiving the second end.

11 Claims, 5 Drawing Sheets

MOUNTING APPARATUS FOR PCI CARD

CROSS-REFERENCE TO RELATED APPLICATIONS

This application is related to co-pending U.S. Patent Application entitled "MOUNTING APPARATUS FOR PCI CARD", U.S. patent application Ser. No. 13/212,482 filed on Aug. 18, 2011.

BACKGROUND

1. Technical Field

The disclosure generally relates to mounting apparatuses, especially, to a mounting apparatus for a peripheral component interconnect (PCI) card.

2. Description of Related Art

PCI cards including network cards, monitor cards, and sound cards, are widely used in a computer. The conventional method for mounting PCI cards usually involves screws and screwdrivers in a tedious endeavor often resulting in lost screws. A screw falling on a printed circuit board (PCB) can result in damage to the PCB.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
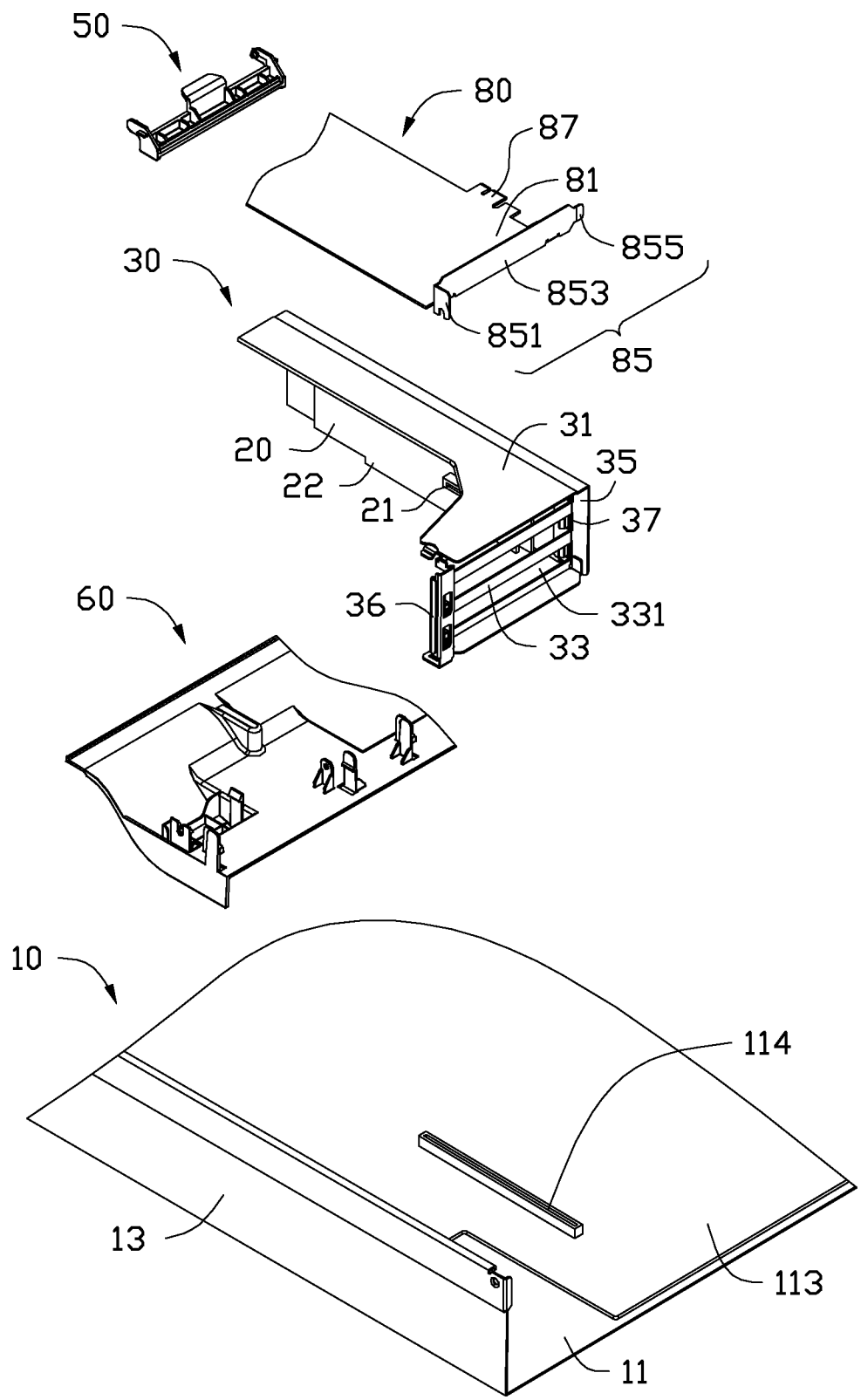
FIG. 1 is an exploded, isometric view of an embodiment of a mounting apparatus for PCI cards.

Referring to FIG. 1, an embodiment of a mounting apparatus for one PCI card 80 is shown. The mounting apparatus includes an enclosure 10, a mounting bracket 30 mounted on the PCI card 80, a securing member 50, and a securing bracket 60 mounted to the enclosure 10.

Figure 4:
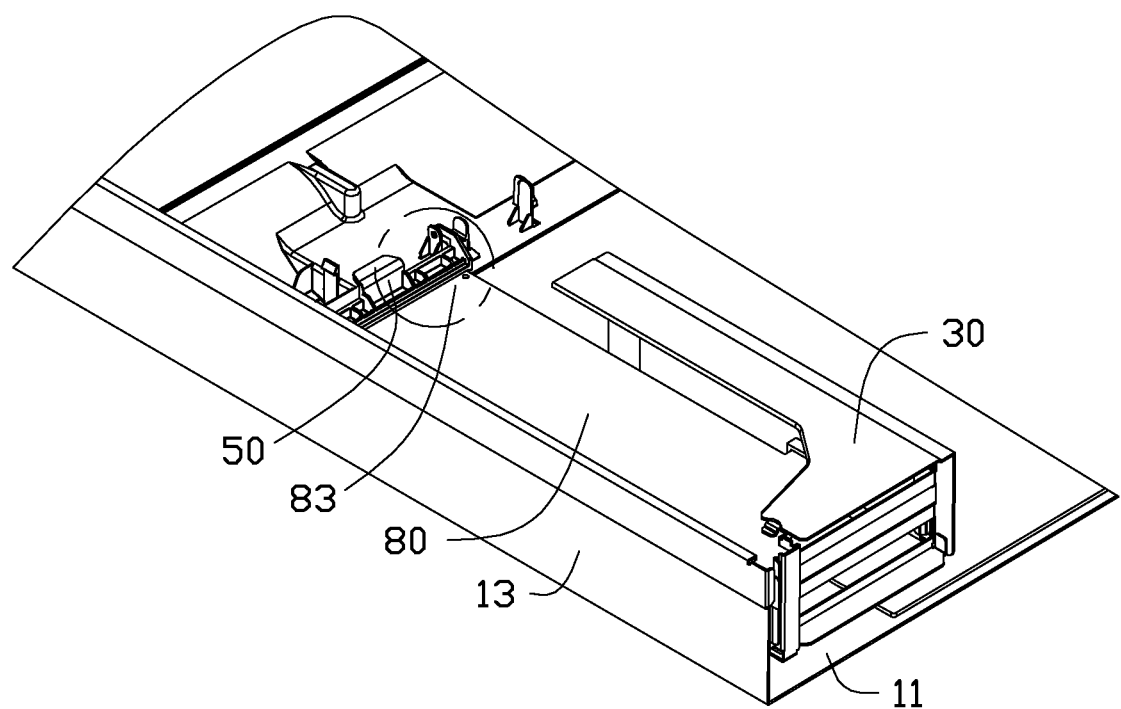
FIG. 4 is an assembled view of FIG. 1.
Figure 5:
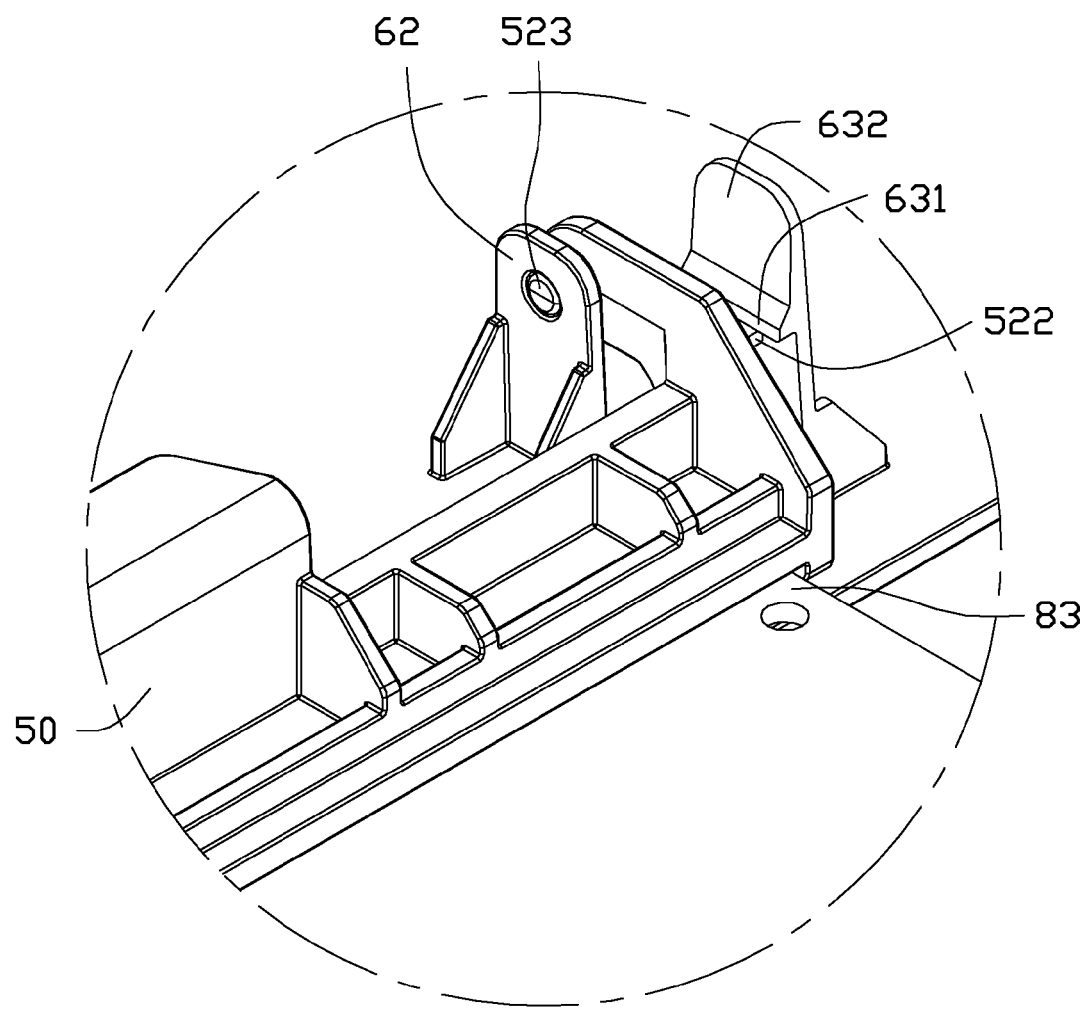
FIG. 5 is an enlarged isometric view of FIG. 4.

The PCI card 80 includes a first end 81 and a second end 83 (shown in FIG. 4).

The first end 81 is mounted to a mounting piece 85. The mounting piece 85 includes a mounting portion 851, a main portion 853 extending from the mounting portion 851, and an inserting portion 855 extending from the main portion 853. The PCI card 80 includes an inserting end 87 close to the first end 81.

The enclosure 10 includes a bottom panel 11 and a side panel 13 substantially perpendicular to the bottom panel 11. A printed circuit board (PCB) 113 mounted on the bottom panel 11. The PCB 113 defines an insertion slot 114. The bottom panel 11 is substantially parallel to the PCI card 80.

The mounting bracket 30 includes a top plate 31, a rear plate 33, and a side plate 35. The rear plate 33 defines a plurality of elongated slots 331. The rear plate 33 includes a blocking tab 36. The side plate 35 defines a plurality of openings 37 corresponding to the inserting portion 855 of the mounting piece 85. A converting card 20 is mounted to the side plate 35. The converting card 20 defines a converting slot 21 corresponding to the inserting end 87 and includes an inserting head 22 corresponding to the insertion slot 114 of the PCB 113.

Figure 2:
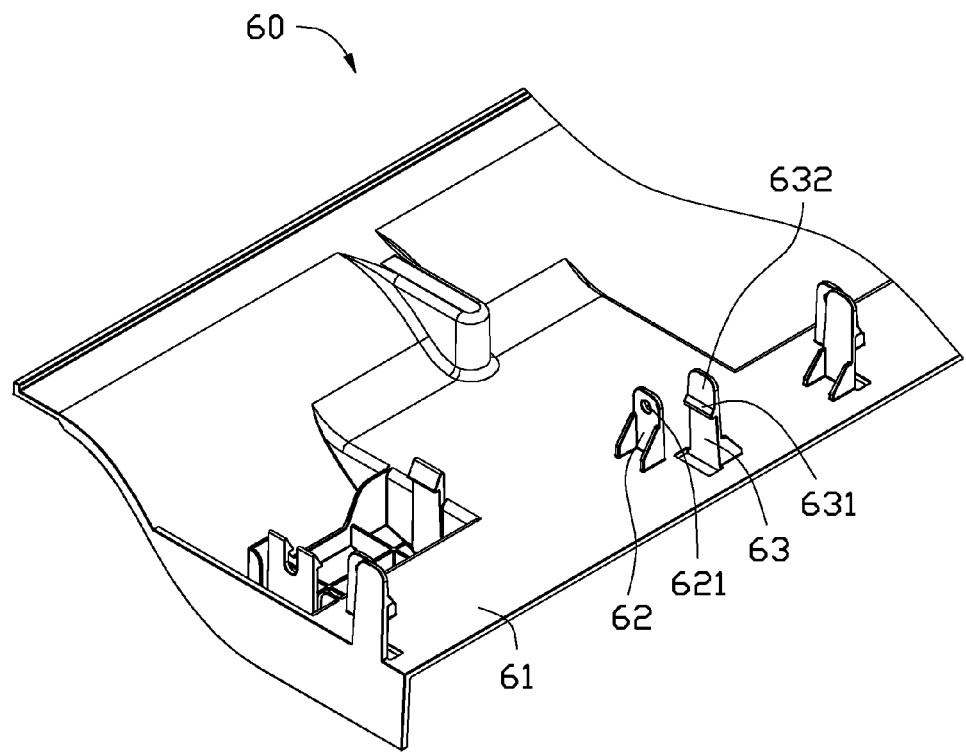
FIG. 2 is an isometric view of a securing bracket of FIG. 1.

Referring to FIG. 2, the securing bracket 60 includes a main body 61, two pivoting portions 62 extending from the main body 61, and two elastic securing portions 63 extending from the main body 61. Each elastic securing portion 63 includes a securing protrusion 631 and a pressing portion 632 extending from the securing protrusion 631. A pivoting hole 621 is defined in each pivoting portion 62.

Figure 3:
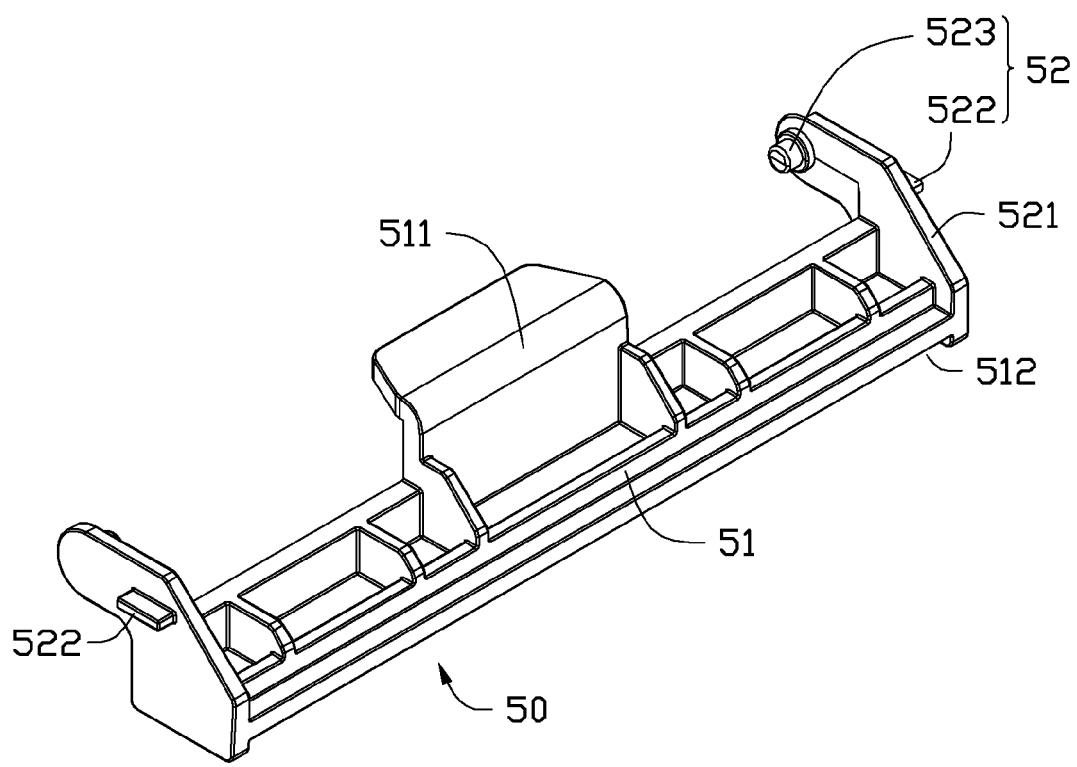
FIG. 3 is an isometric view of a securing member of FIG. 1.

Referring to FIG. 3, the securing member 50 includes a pressing panel 51 and two mounting parts 52 extending from opposite sides of the pressing panel 51. Each of the mounting parts 52 includes a mounting body 521, a securing part 522 extending from the mounting body 521, and a pivoting post 523 extending from the mounting body 521. The securing part 522 and the pivoting post 523 of each mounting part 52 are disposed on opposite sides of the mounting body 521. The two pivoting posts 523 correspond to the two pivoting holes 621 of the securing bracket 60. The two securing parts 522 correspond to the two elastic securing portions 63 of the securing bracket 60. The securing member 50 further includes a handle 511 extending from the pressing panel 51. The handle 511 is L-shaped. The pressing panel 51 defines a receiving slot 512 corresponding to the second end 83 of the PCI card 80.

Referring to FIGS. 1 to 5, in assembly of the securing member 50 to the securing bracket 60, the pivoting posts 523 of the securing member 50 are inserted in the pivoting holes 621 of the securing bracket 60 to pivotally attach the securing member 50 to the securing bracket 60. The securing bracket 60 is secured to the bottom panel 11 of the enclosure 11 via a plurality of screws (not shown).

The inserting portion 855 of the PCI card 80 is received in the openings 37 and the inserting end 87 is inserted into the converting slot 21 of the converting card 20. The mounting portion 851 abuts the blocking tab 36.

The inserting head 22 of the converting card 20 is inserted into the insertion slot 114. The second end 83 of the PCI card 80 is placed on the main body 61. The securing member 50 is rotated to enable the securing part 522 of the securing member 50 to engage with the securing protrusion 631 of the enclosure 60. At this time, the pressing panel 51 of the securing member 50 presses the second end 83 of the PCI card 80. The second end 83 is received in the receiving slot 512.

In disassembly, the pressing portions 632 of the securing bracket 60 is pressed outward to enable the securing protrusions 631 to disengage from the securing part 522. The handle 511 is pulled to move away from the PCI card 80 to enable the securing member 50 to disengage from the second end 83. Thus, the PCI card 80 can be easily removed from the enclosure 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for a PCI card, comprising: an enclosure; the enclosure comprises a bottom panel and a side panel; the PCI card substantially parallel to the bottom panel; a mounting bracket securing a first end of the PCI card; the mounting bracket is mounted on the bottom panel; the mounting bracket comprises a rear plate substantially perpendicular to the side panel; and the rear plate defines an elongated slot corresponding to the PCI card; a securing bracket mounted in the enclosure, the securing bracket comprising a main body and an elastic securing portion extending from the main body; and a securing member comprising a pressing panel and two mounting parts located on opposite sides of the pressing panel; each mounting part comprises a mounting body, a pivoting post rotatably secured to the main body, and a securing part engaged with the elastic securing portion; wherein the pivoting post extends from a first side of the mounting body and, and the securing part extends from a second opposite side of the mounting body; wherein the elastic securing portion comprises a securing protrusion engaging the securing part and a pressing portion extending from the securing protrusion; the pressing portion drives the securing protrusion to disengage from the securing part when the pressing portion is pressed; wherein when the pressing panel abuts a second end of the PCI card, the pressing panel is substantially parallel to the PCI card and the bottom panel.

2. The mounting apparatus for a PCI card of claim 1, wherein a pivoting hole is defined in the securing bracket corresponding to the pivoting post.

3. The mounting apparatus for a PCI card of claim 1, wherein the securing member comprises a handle extending from the pressing panel to drive the pressing panel to rotate when the handle is operated, and the handle is located between the two mounting parts.

4. The mounting apparatus for a PCI card of claim 3, wherein the handle is L-shaped.

5. The mounting apparatus for a PCI card of claim 1, wherein the pressing panel defines a receiving slot to receive the second end.

6. A PCI card assembly, comprising: an enclosure comprising a bottom panel and a side panel substantially perpendicular to the bottom panel; a PCI card substantially parallel to the bottom panel, the PCI card comprising a first end and a second end; a mounting bracket securing the first end of the PCI card; the mounting bracket is mounted on the bottom panel; the mounting bracket comprises a rear plate substantially perpendicular to the side panel; and the rear plate defines an elongated slot corresponding to the PCI card; a securing bracket mounted in the enclosure, the securing bracket comprising a main body and an elastic securing portion extending from the main body; and a securing member pivotably mounted on the securing bracket, the securing member comprising a pressing panel and two mounting parts located on opposite sides of the pressing panel; each mounting part comprises a securing part engaging with the elastic securing portion to enable the second end to be disposed between the main body and the pressing panel, the pressing panel abuts the second end to prevent the second end from moving along a direction substantially perpendicular to the bottom panel, and when the pressing panel abuts the second end, the pressing panel is substantially parallel to the PCI card and the bottom panel; wherein the elastic securing portion comprises a securing protrusion engaging the securing part and a pressing portion extending from the securing protrusion; the pressing portion drives the securing protrusion to disengage from the securing part when the pressing portion is pressed.

7. The PCI card assembly of claim 6, wherein the pressing panel defines a receiving slot and the second end is received in the receiving slot.

8. The PCI card assembly of claim 6, wherein the securing member further comprises a mounting body and a pivoting post extending from the mounting body; and a pivoting hole is defined in the securing bracket corresponding to the pivoting post.

9. The PCI card assembly of claim 8, wherein the securing part extends from the mounting body, and the securing part and the pivoting post extend from opposite sides of the mounting body.

10. The PCI card assembly of claim 6, wherein the securing member comprises a handle extending from the pressing panel to drive the pressing panel to rotate when the handle is operated, and the handle is located between the mounting parts.

11. The PCI card assembly of claim 10, wherein the handle is L-shaped.

* * * * *